United States Patent
Shamshoum et al.

(10) Patent No.: US 6,667,380 B1
(45) Date of Patent: Dec. 23, 2003

(54) CATALYST FORMULATION AND POLYMERIZATION PROCESSES

(75) Inventors: Edwar S. Shamshoum, Houston, TX (US); David J. Rauscher, Webster, TX (US); Shabbir A. Malbari, Pasadena, TX (US)

(73) Assignee: Fina Technology, Inc., Houston, TX (US)

( * ) Notice: Subject to any disclaimer, the term of this patent is extended or adjusted under 35 U.S.C. 154(b) by 372 days.

(21) Appl. No.: 09/643,540

(22) Filed: Aug. 22, 2000

Related U.S. Application Data (63) Continuation of application No. 07/846,930, filed on Mar. 4, 1992, now abandoned.

(51) Int. Cl.$^7$ .............................................. C08F 110/06
(52) U.S. Cl. ................. 526/351; 526/123.1; 526/124.1; 526/124.3; 526/125.1; 526/128; 526/348; 502/103; 502/104; 502/115; 502/116
(58) Field of Search ........................... 526/123.1, 124.1, 526/124.3, 125.1, 128, 348, 351; 502/103, 104, 115, 116

(56) References Cited

U.S. PATENT DOCUMENTS

| | | | | |
|---|---|---|---|---|
| 4,767,735 A | * | 8/1988 | Ewen et al. | 502/109 |
| 4,927,797 A | * | 5/1990 | Ewen | 502/127 |
| 4,952,649 A | * | 8/1990 | Kioka et al. | 526/125 |

* cited by examiner

*Primary Examiner*—Ling-Siu Choi
(74) *Attorney, Agent, or Firm*—William D. Jackson; Bradley A. Misley (57) ABSTRACT

Processes for the formulation of Ziegler-type catalysts from a plurality of catalyst components including transition metal, organosilicon electron donor, and organoaluminum co-catalyst components. The components are mixed together in the course of formulating the Ziegler-type catalyst to be charged to an olefin polymerization reactor. Several orders of addition of the catalyst components can be used in formulating the Ziegler catalyst. One involves mixing of the transition metal component with the organoaluminum co-catalyst to formulate a mixture having an aluminum/transition metal mole ratio of at least 200. This mixture is combined with the organosilicon electron donor component to produce a Ziegler-type catalyst formulation having an aluminum/silicon mole ratio of no more than 50. There may be an initial pre-polymerization of the catalyst prior to introducing the catalyst into an olefin polymerization reactor. The mole ratio of aluminum to silicon in the catalyst formulation within the range of 20 to 50 and the mole ratio of silicon to transition metal within the range of 10–20. Relatively short time sequences can be used in formulating the Ziegler-type catalyst. Another order of addition involves initial contact of the organoaluminum co-catalyst and the organosilicon electron donor to provide a mixture having an aluminum to silicon mole ratio of at least 10. This mixture is then combined with the transition metal component having an aluminum/transition metal mole ratio of at least 200.

17 Claims, 7 Drawing Sheets

CATALYST FORMULATION AND POLYMERIZATION PROCESSES

This application is a continuation of prior application Ser. No. 07/846,930, filed Mar. 4, 1992 now abandoned.

FIELD OF THE INVENTION

This invention relates to the polymerization of unsaturated hydrocarbons over Ziegler-type catalysts, and more particularly, to processes for formulating such catalysts by sequentially mixing the various components thereof and controlling the orders of addition and the durations of mixing such catalyst components.

BACKGROUND OF THE INVENTION

The polymerization of unsaturated hydrocarbons over Ziegler-type catalysts is well known in the art. Such hydrocarbons normally take the form of short chain alpha olefins such as ethylene, propylene and butylene, including substituted alpha olefins such as substituted vinyl compounds, for example, vinyl chloride or vinyl toluene. However, such unsaturated hydrocarbons can also include di-olefins such as 1-3-butadiene or 1-4-hexadiene or acetylenically unsaturated compounds such as methylacetylene or 2-butyne.

Ziegler-type catalysts incorporate a transition metal, usually titanium, zirconium or hafnium, although other transition metals found in Groups 4, 5 and 6 of the Periodic Table of Elements may be employed, which function to provide sites for the insertion of monomer units into growing polymer chains. One type of such polymerization catalysts are the so-called homogeneous catalyst systems in which the transition metal compound is a metallocene comprising one or more substituted or unsubstituted cyclopentadienyl groups coordinated with the transition metal atom forming the situs for polymer growth. Such metallocene-based catalyst systems are the subject of European Patent Application EP 129,368 and U.S. Pat. Nos. 4,794,096 to Ewen and 4,892,851 to Ewen et al., the latter two patents disclosing catalysts useful in the polymerization of propylene to form isotactic or syndiotactic polypropylene.

The more widely used transition metal catalysts are the so-called heterogeneous catalyst systems in which a transition metal halide, usually zirconium, hafnium or titanium, di-, tri-, or tetra-halides, are incorporated with a support structure, principally based upon magnesium or zinc halides, ethoxides or the like. For example, U.S. Pat. No. 4,476,289 to Mayr et al. discloses so-called "activated" titanium tetrahalides, more specifically, titanium tetrachloride, supported on anhydrous magnesium or zinc halides, principally magnesium chloride or magnesium bromide. The transition metal component is used in conjunction with a second component, commonly referred to as a co-catalyst, which as described in the Mayr et al. patent, is a hydride or organo-metallic compound based primarily upon aluminum, although lithium or magnesium based compounds are also disclosed. A supported catalyst containing yet another component is disclosed in U.S. Pat. No. 4,636,486 to Mayr et al. Here, the titanium compound, which may be a halide, an oxyhalide or an alcoholate in either the di-, tri- or tetra-valent form, is composited with the magnesium support, together with an electron donor compound. Such electron donors, commonly referred to as internal electron donors because they are incorporated as part of the transition metal catalyst component, can be selected from a broad class of compounds including amines, amides, phosphines, ethers, thioethers, alcohol esters, aldehydes, and ketones. As in the case of the aforementioned U.S. Pat. No. 4,476,289 to Mayr, the catalyst system here also includes an organoaluminum co-catalyst such as triethylaluminum, commonly referred to as TEAL. Both of the Mayr et al. patents teach that the molar ratio of the organoaluminum compound and the titanium catalyst component is not critical. In the polymerization of ethylene, such ratio is said to preferably be between 50 and 1,000.

Yet a third component often employed in Ziegler-type catalyst systems is a so-called external electron donor. The external electron donors function similarly as the internal electron donors and in a complimentary or supplementary manner to regulate monomer insertion into the polymer chain growing on the transition metal active sites. Thus, the electron donors can have an impact upon catalyst activity, polymer molecular weight, and polymer morphology as reflected in stereospecificity and physical parameters such as melting point. For example, in the polymerization of propylene, the addition of electron donors under controlled conditions can result in dramatic increases in activity (the amount of polymer produced per unit of catalyst) and in stereoregularity, e.g., an increase in isotactic polymer with a corresponding decrease in atactic. The most widely used external electron donors are organosilicon compounds such as organosilanes and organosiloxanes, including silyl ethers and esters such as alkyl or arylalkyl alkoxysilanes.

The complimentary nature of the internal and external electron donors is addressed in Soga, K. et al., "Effect of Diesters and Organosilicon Compounds on the Stability and Stereospecificity of Ziegler-Natta Catalysts", Transition Metal Catalyzed Polymerizations: Ziegler-Natta and Metathesis Polymerizations, Quirk, R. P., Ed., Cambridge University Press, New York, 1988, pp. 266–279. As discussed in Soga, the concentrations of the internal and external donors in the catalyst system can be adjusted in order to optimize the activity and the stereospecificity of the catalyst. In the experimental work reported there, the transition metal catalyst component comprising titanium tetrachloride supported on magnesium dichloride with an internal donor, e.g., di-N butylphthalate, was slurried in hexane followed by the addition of an external electron donor, phenyl triethoxysilane, and triethylaluminum (TEA) co-catalyst. Soga et al. report on polymerization rates over periods of several hours and isotactic indices measured over periods of several hours for various internal, external catalyst systems using several kinds of organosilicon compounds at varying concentrations expressed in terms of silicon titanium mole ratios and TEA/titanium mole ratios. Among the various electron donors used in the Soga et al. experimental work, diphenyldimethoxysilane appeared to have the most efficiency in terms of improving activity and/or stereospecificity of the catalyst system, followed by phenyltriethoxysilane, followed in turn by phenyltrimethoxysilane. Various other organosilicon compounds were generally less efficient, although still effective. The aluminum/titanium mole ratios employed in Soga range from about 50 to 200; the silicon/titanium mole ratios range from about 10 to 50.

U.S. Pat. No. 4,287,328 to Kikuta et al., is directed to the polymerization of alpha olefins in the presence of multi-component catalyst systems involving a "solid product" combined with an organoaluminum compound including, for example, $C_1$–$C_{10}$ trialkylaluminum, triethylaluminum, alkyl alkyoxyaluminums, and alkylaluminum halides, and an electron donor including various brganic acids, alcohols, ethers, aldehydes, ketones, amines, alkenol amines, esters, phosphines, phosphites, thioethers, thioalcohols, silanes, and siloxanes. The "solid product" catalyst component is formed by reacting a trivalent metal halide such as aluminum trichloride, aluminum tribromide or ferric trichloride with a divalent metal compound such as magnesium, calcium, or zinc hydroxide or oxide or carbonate with titanium tetrachloride, characterized as an electron acceptor. Numerous orders of additions of the various components are described in Kikuta et al., especially in columns 6 through 9. Conditions of mixing can vary over wide temperature ranges and time intervals, but temperatures are preferably in the range of room temperature to about 100° C. The mixing of the various components can be carried out over periods of several minutes to several hours.

U.S. Pat. No. 4,567,155 to Tovrog et al., discloses multi-component catalyst systems useful in the gas phase polymerization of alpha olefins. In Tovrog et al., the catalyst systems comprise two base catalyst components, each containing subcomponents. The first component, identified as component "A" comprises a titanium component supported on a hydrocarbon insoluble magnesium component in combination with an electron compound. The second major component is a co-catalyst component, characterized as component "B" comprising a trialkylaluminum, an aromatic acid ester and an unhindered secondary amine. Tovrog discloses that the catalyst components may be mechanically activated by comminution prior to use in polymerization. Comminuted catalysts may be pre-polymerized with an alpha olefin before use as a polymerization catalyst component. In the pre-polymerization procedure, comminuted catalysts and an organoaluminum compound co-catalyst are contacted with an alpha olefin under polymerization conditions and preferably in the presence of a modifier such as methyl-p-toluate and an inert hydrocarbon such as hexane, with typical time durations for pre-polymerization and other pretreatment procedures involving periods of minutes up to a few hours.

U.S. Pat. No. 4,767,735 to Ewen et al. discloses a pre-polymerization process carried out over a period of less than a minute and usually ten seconds or less. In the Ewen et al. procedure, an organic solvent stream such as hexane or heptane is established in a pre-mixing line. To this stream are added sequentially a co-catalyst (TEAL), an external electron donor, diphenyldimethyoxysilane (DPMS) and a supported catalyst component (titanium tetrachloride supported on magnesium dichloride) to form a catalyst system which is then pre-polymerized by contact with propylene for a few seconds. An alternative mode of addition in the Ewen et al. procedure is to add the electron donor to the carrier stream after the addition of the titanium catalyst component, but still before the addition of the propylene. Ewen et al. disclose that the co-catalyst should be present when the electron donor and the transition metal catalyst component contact one another in order to avoid poisoning of the titanium catalyst. In the experimental work described in Ewen et al., one of two titanium chloride catalysts were used in conjunction with TEAL and DPMS under unspecified catalyst concentrations, but at relative amounts of TEAL and DPMS ranging from 2 mmol of TEAL and 0.4 mmol of DPMS (Al/Si ratio of 5) to 2 mmol of TEAL and 0.03 mmol of DPMS (Al/Si ratio of about 67). High efficiency catalyst systems employing external electron donors which may be characterized generally as sec or tert alkyl or cycloalkyl, alkyl dialkoxy silanes in combination with titanium tetrachloride supported on magnesium based supports derived from dialkoxy magnesium compounds are disclosed in U.S. Pat. No. 4,927,797 to Ewen. By way of example, the supported catalyst may be formulated through the reaction of diethoxy magnesium, titanium tetrachloride, and n-butyl phthalate under appropriate conditions as specified in the patent. A suitable external electron donor here is methylcyclohexyl dimethoxysilane, which is compared with diphenyldimethoxysilane as disclosed in the aforementioned Ewen et al. patent.

SUMMARY OF THE INVENTION

In accordance with the present invention there are provided novel processes for the formulation of Ziegler-type catalysts from catalyst components involving various orders of addition and mixing times between the several catalyst components. The catalyst components utilized in carrying out the invention involve a transition metal component, an organosilicon electron donor component, and an organoaluminum co-catalyst component which are sequentially mixed together in the course of formulating the Ziegler-type catalyst to be charged to an olefin polymerization reactor.

In carrying out the invention, different orders of addition of the several catalyst components can be used with the relative amounts of catalyst components varying depending upon the particular order of addition. In most cases, the preferred order of addition will involve initial mixing of the transition metal catalyst component with the organoaluminum co-catalyst component. These components are employed together to formulate a precursor mixture having a ratio of aluminum to transition metal mole (atomic) ratio of at least 200. The resulting precursor mixture is then combined with the organosilicon electron donor component to produce a Ziegler-type catalyst formulation in which the transition metal catalyst component and the electron donor component are present in relative amounts to provide an aluminum/silicon mole ratio of no more than 50. The mixture of the three components is then contacted with an olefin to effect polymerization of the olefin in the presence of the thus formulated Ziegler-type catalyst. Preferably, the olefin contacting step involves an initial pre-polymerization reaction to effect pre-polymerization of the catalyst prior to introducing the resulting pre-polymerized catalyst into a polymerization reactor containing an olefin. In this embodiment of the invention, it is preferred that the mole ratio of aluminum to silicon in the catalyst formulation be within the range of 20 to 50. The mole ratio of silicon to transition metal is at least 5 and more preferably, within the range of 10–20. Relatively short time sequences are preferably employed in formulating the Ziegler-type catalyst. More specifically, the precursor formulation of the organoaluminum co-catalyst and transition metal catalyst components is maintained for a time within the range of 5–120 seconds prior to subsequent contact with the organosilicon electron donor component. This then is followed by maintaining this formulation with the added electron donor component in contact for a period ranging up to 110 seconds prior to contact of the formulation with the olefin.

A further embodiment of the invention involves the formulation of a Ziegler-type catalyst as described above, by initial contact of the organoaluminum co-catalyst component with the organosilicon electron donor component. Here, the two components are used in relative amounts to provide a precursor mixture having an aluminum to silicon mole ratio of at least 10. This precursor formulation is then combined with the transition metal component to provide a formulation in which the aluminum/transition metal mole ratio is at least 200, followed by contact of the thus formulated catalyst mixture with an olefin to effect polymerization thereof in the presence of the catalyst mixture. The initial mixture of the organoaluminum and organosilicon compounds preferably is maintained for a time of 5–120 seconds and more preferably, in the range of 10–60 seconds prior to addition of the transition metal component. The resulting three component mixture is then maintained in contact for a period of up to 110 seconds, and preferably no more than 40 seconds prior to contact with the olefin in the subsequent polymerization step. Preferably, the silicon to transition metal mole ratio is at least 10; the aluminum to silicon mole ratios and the aluminum to transition metal mole ratios are within the range of 10–40 and 200–400, respectively.

In yet a further aspect of the invention, an order of addition is followed in which the organosilicon component and the transition metal catalyst component are initially mixed to form a precursor mixture having a mole ratio of silicon to transition metal of at least 5 for a first contact time up to 40 seconds and preferably no more than 30 seconds. This precursor mixture is then combined with the organoaluminum co-catalyst component to provide a Ziegler-type formulation having an aluminum/silicon ratio of no more than 40. The second contact time prior to contact of the Ziegler-type catalyst mixture with an olefin is such as to provide a total of the first and second contact times of no more than 60 seconds. In this embodiment of the invention, it is preferred that the silicon to transition metal mole ratio be within the range of 5–20.

As described previously, at the conclusion of the second contact time for various orders of addition, the resulting three component mixture is then contacted with an olefin to effect polymerization thereof in the presence of the catalyst mixture. For each of the various orders of addition it is preferred that a pre-polymerization step be carried out prior to introducing the catalyst into the main reactor. Preferably, the pre-polymerization is carried out for a relatively short period, usually of a duration of less than a minute and preferably less than 20 seconds.

DETAILED DESCRIPTION OF THE INVENTION

In the polymerization of unsaturated hydrocarbons over Ziegler-type catalysts, a desideratum common to all such processes, is a high yield of polymer, commonly expressed in terms of catalyst activity. Catalyst activity is normally in terms of grams of polymer per gram of transition metal per hour.

A second important characteristic in polymer production is the bulk density of the polymer. The bulk density, commonly expressed in terms of grams per cubic centimeter, should be relatively high. If the bulk density is too low, the polymer will tend to be "fluffy" and will tend to cause plugging and handling problems in the product transfer system. This is particularly important in continuous or a semi-continuous polymerizations where plugging of the withdrawal outlet or another point in the polymerization system can cause serious interruptions in production schedules.

Yet a third important polymer characteristic which is: particularly significant in the case of alpha olefins containing three or more carbon atoms is the crystallinity of the polymer product. By way of example, in the polymerization of propylene, the resulting polymer product can be isotactic, syndiotactic or atactic. Syndiotactic and isotactic polymers are crystalline and are insoluble in hydrocarbons solvents such as xylene. Atactic polymers, on the other hand, are amorphous, waxy-type materials which exhibit high solubility in xylene.

As described, for example, in U.S. Pat. No. 4,892,851 to Ewen et al., isotactic and syndiotactic polymers are regular repeatable structures which can be characterized in terms of the Fischer projection formula as described below. In the isotactic structure, all of the methyl groups attached to the tertiary carbon atom of the successive monomer units lie on the same side of a hypothetical plane extending through the main chain of the polymer as indicated schematically by the following two-dimensional representation.

(1)

For syndiotactic structures, the methyl groups attached to the tertiary carbon atoms on successive monomer units lie on alternative sides of the hypothetical plain is as follows:

(2)

For structure (1) above, the isotactic arrangement may be described employing Bovey's NMR nomenclature as—mmmm—in which each m represents a "meso" dyad of two successive methyl groups on the same side of the plane. Using this same nomenclature, the syndiotactic structure (2) above, may be described as—rrrr—, with each r indicating a "racemic" dyad of two successive methyl groups on opposite sides of the hypothetical plane. Of course, similar characterizations may be made for other polymers such as polystyrene or polyvinyl chloride. The non-crystalline atactic polymers involve randomly irregular structures. For a further description of other characterizations of atactic, isotactic and syndiotactic polymers, reference may be had to the aforementioned U.S. Pat. Nos. 4,794,096 and 4,892,851, the entire disclosures of which is incorporated herein by reference.

From the foregoing description, it will be recognized that the crystallinity of a polymer such as polypropylene can be characterized in terms of the percentage of the polymer which is soluble in xylene. For highly crystalline isotactic or syndiotactic polypropylene, with few atactic imperfections, the percent of the polymer soluble in xylene will be quite low, typically on the order of 4% or less and sometimes, below 3%. As the polymer chain becomes more atactic, xylene solubles can range to figures well in excess of 5%, which indicates polymers, while still retaining good structural integrity, having a high degree of atactic imperfections.

The present invention; may be carried out employing individual catalyst components which are, in themselves, well known to those skilled in the art. As described previously, there are a wide variety of transition metal catalysts known to be useful in olefin polymerization and such transition metal catalysts may be employed in the present invention. As a practical matter, it usually will be desirable to use a supported catalyst component and while a supported catalyst component which does not require an internal electron donor, as described, for example, in the aforementioned U.S. Pat. No. 4,476,289 to Mayr et al., may be used, it normally is preferred to employ a supported transition metal catalyst incorporating an internal electron donor as described in the aforementioned Mayr et al. U.S. Pat. No. 4,636,486. The Ziegler transition metal catalysts include, as is well known in the art, salts of transition metals found in Groups 4, 5 and 6 (New Notation) of the Periodic Table of Elements. In addition to the titanium, zirconium and hafnium transition metal components commonly employed in olefin polymerizations, other such transition metals proposed for use in commercial Ziegler-type catalysis include vanadium, niobium, and chromium.

Like the transition metal component, the co-catalyst components employed in the present invention can also be selected from materials which are old and well known in the art. The co-catalyst components used in the present invention are organoaluminum compounds which can include trialkylaluminum, dialkyl aluminum hydrides and halides, and alkyl aluminum compounds such as alkyl aluminum dihalides. Aluminum mono-, di-, or tri-alkoxides or phenoxides and the like may also be employed in the present invention. Suitable organoaluminum compounds useful as co-catalysts in Ziegler-Natta catalyst formulations are disclosed in the aforementioned patents to Mineshima et al. and Tovrog et al., as well as in U.S. Pat. No. 3,642,746 to Kashiwa et al. As a practical matter, the co-catalyst will usually take the form of an aluminum alkyl or aluminum alkyl halide, which, in some cases, may be complexed with another metal alkyl such as a lithium alkyl. Probably the most widely used co-catalysts are trimethylaluminum (TMA) and triethylaluminum (TEAL) with the latter normally being preferred as a co-catalyst in the polymerization of $C_3+$ alpha olefins such as in the production of polypropylene, propylene co-polymers, polyvinylchloride, and the like. For a general discussion of transition metal and organoaluminum co-catalyst components in Ziegler catalysis, reference is made to Boor, John "Ziegler-Natta Catalysts in Polymerizations", Academic Press, Inc., New York (1979) and particularly, Chapter 4 entitled "Chemical Description of Ziegler-Natta Catalysts for Olefins".

A wide variety of organosilicon electron donors may be employed in carrying out the present invention. The electron donors used are Lewis bases which function in the nature of external electron donors as described previously. The electron donor used here will take the form of organic silicon-containing compounds such as an organic siloxane or silane. Particularly suitable examples include methylcyclohexyl dimethoxysilane, isobutyl trimethoxysilane and diphenyl dimethoxysilane. Other suitable catalyst components which can be used in carrying out the invention are disclosed in the aforementioned paper by Soga et al. and U.S. Pat. No. 4,287,328 to Kikuta et al., U.S. Pat. No. 4,567,155 to Tovrog et al., U.S. Pat. No. 4,316,966 to Mineshima et al., and U.S. Pat. No. 4,927,797 to Ewen, the entire disclosures of which are incorporated herein by reference.

Specific applications of the present invention involve the formulation of Ziegler-type catalysts by mixing the various components thereof under certain specific orders of additions and contact times between components when going from one contacting step to another. After the several components are mixed together, the resulting multi-component catalyst is then contacted with the unsaturated monomer, preferably an alpha olefin, to effect polymerization of the monomer in the presence of the Ziegler-type catalyst. Preferably, the initial olefin contacting step subsequent to formulation of the composite catalyst is a pre-polymerization step with the resulting pre-polymerized catalyst then being supplied to a polymerization reactor to produce the desired polymer product.

The polymerization process may be carried out as either a batch-type, continuous, or semi-continuous process, but preferably, polymerization of the olefin monomer (or monomers) will be carried out in a loop-type reactor of the type disclosed in the aforementioned U.S. Pat. No. 4,767, 735 to Ewen et al. As described in the Ewen et al. patent, when the catalyst components are formulated together, they are supplied to a linear tubular pre-polymerization reactor where they are contacted for a relatively short time with the pre-polymerization monomer prior to being introduced into the main loop-type reactor. By way of example, the residence time of the catalyst and monomer within the pre-polymerization reactor will be normally less than a minute, and usually within the range of a few seconds to perhaps 20 seconds. In the experimental work described hereinafter, the catalyst components, after being combined to form the Ziegler-type catalysts, were pre-polymerized for a period of five seconds. Durations of this nature will be suitable in many commercial applications.

In practice, the most significant application of the present invention will be in the polymerization of $C_3+$ alpha olefins and particularly those polymerizations involving propylene, either alone or with another olefin, for example ethylene, to produce polypropylene or co-polymers such as ethylene/propylene co-polymer. The preferred transition metal components will be in the form of the titanium, zirconium or hafnium halides with supported tetravalent components such as titanium tetrachloride, being used in most commercial applications. Supports will normally take the form of a magnesium or zinc dihalide, dialkyl or dialkoxide such as magnesium dichloride or magnesium diethoxide, which may include magnesium alkoxide halides such as magnesium diethoxychloride. The co-catalyst in such applications will normally take the form of a trialkyl aluminum such as TEAL or TMA as described previously, and the electron donor, a siloxane or silane, and more specifically, cyclohexylmethyldimethoxysilane as described previously.

As disclosed in co-pending application Ser. No. 846,540, filed of even date by the same inventors herein entitled "CATALYST FORMULATION AND POLYMERIZATION PROCESSES" now U.S. Pat. No. 5,432,139, the orders of addition and the contact times for the various orders of addition can be tailored to arrive at the desired characteristics of the final polymer product and to influence catalyst yields, for example, as measured by the catalyst efficiency in mass of polymer per mass of catalyst per unit of time. In addition, the aluminum/transition metal, aluminum/silicon and silicon/transition metal ratios can be varied to impact catalyst yields and polymer properties such as molecular weight distribution and xylene solubles. The results of varying these ratios for different orders of addition and modes of operations are indicated by the results of the experimental work described below. As shown by the experimental work set forth herein and also in the aforementioned U.S. Pat. No. 5,432,139, orders of addition, component ratios, and contact times can be interrelated in terms of polymer product and process characteristics. However, some general observations regarding contact times and orders of addition can be made by comparative experimental work in which the relative amounts of components remained constant while changing orders of additions and contact times. In general, it has been found that the order of addition in which the transition metal catalyst component and the organoaluminum component are mixed together first (a first contact time within the range of 5 to 120 seconds) followed by contact with the organosilicon electron donor (for a second contact time of about 110 seconds or less, and preferably a duration which is shorter than the first contact time), generally produces the best overall results in terms of polymer yield, polymer bulk density, and crystallinity as measured by a low xylene solubles content.

Considering all three of the above-described parameters, the second most favorable order of addition of the catalyst components involves initially mixing the electron donor and the co-catalyst followed by contacting the resulting mixture with the transition metal catalyst component. Here, the bulk density is somewhat lower and the xylene solubles of the polymer product somewhat higher than in the case of the first order of addition. However, the polymer yield for this secondary order of addition can be forced somewhat higher than for the first order of addition and thus, this embodiment of the invention can be employed where the yield is of paramount concern. Here, the contact times are generally 5–120 seconds for the first mixture and up to 110 for the second prior to contact with the olefin.

The tertiary order of addition involving first mixing the catalyst and electron donor and then contacting this mixture with the co-catalyst yields results which, in general, are not as good as those achieved by the first two orders of additions. However, where xylene solubles are of paramount concern, an extremely low xylene soluble content can be achieved by using very short contact times in conjunction with this tertiary order of addition.

The significance of and advantages achieved by the various orders of additions and relative amounts of components together with various contact times which can be employed in accordance with the present invention are further indicated by the experimental work described below. In this experimental work, the transition metal catalyst component was a supported titanium tetrachloride catalyst formulated on a magnesium-based support and incorporating N-dibutylphthalate as an internal electron donor. The catalyst had a titanium content of about 2 wt. %. Catalysts of this general nature are known in the art as evidenced, for example, by the aforementioned U.S. Pat. No. 4,927,797.

The co-catalyst used in the experimental work was triethylaluminum (TEAL), which as noted previously, is a conventional co-catalyst used in the polymerization of propylene. The co-catalyst as used in the experimental work was a 0.2 molar solution of TEAL in hexane which had been freshly distilled and dried. The external organosilicon compound used as the electron donor used in the experimental work was cyclohexylmethyldimethoxysilane (CMDS) which was obtained from a commercial service, and dried by absorption over a molecular sieve.

In an initial suite of experimental work, the catalyst components were used in relative amounts of 10 mg of transition metal catalyst, 1 mmol of TEAL and 0.025 mmol of CMDS to provide an aluminum/titanium mole (atomic) ratio of 200 (Al/Ti=200) and an aluminum/silicon mole (atomic) ratio of 40 (Al/Si=40). As disclosed in detail in the aforementioned U.S. Pat. No. 5,432,139, to which reference is made, by maintaining the Al/Ti and Al/Si ratios constant in this suite of experimental work described in this application, good comparative indications are provided of the effect of orders of additions and contact times on catalyst yield and also the polymer characteristics of bulk density and xylene soluble content, which as discussed previously, provides a measure of polymer crystallinity.

Each polymerization run was carried out for a period of one hour at 70° C. Preliminary to conducting the polymerization run, approximately 16 mmol of hydrogen under a pressure of 120 psig was discharged to an empty 2 L Zipperclave reactor which was dried and kept under an internal nitrogen pressure of 1–2 psig. Immediately after charging the reactor with hydrogen, 1 L of propylene was charged to the reactor which was then heated to 70° C. and stirred at 1,000 rpm to effect liquid phase polymerization of the propylene.

The catalyst components were contacted under the various orders of additions and contact times as described below using an arrangement of 4 series connected stainless steel bombs, each having a volume of 40 Ml and connected to one another in series through ¼ inch stainless steel ball valves. The several bombs used in this experimental study were connected in a manner as described in greater detail in co-pending U.S. patent application Ser. No. 816,689 entitled "METHODS AND SYSTEMS FOR MULTI-COMPONENT CATALYST FORMULATION", filed on even date by the inventors herein.

In the particular configuration used in the experimental work reported herein, four bombs were connected in series, with the first two bombs containing the catalyst components mixed together during the initial contacting step, the third bomb being empty, and the fourth bomb containing the catalyst component contacted in the second contact step with the initially formed mixture. The series connected bombs were arranged vertically so that flow from one chamber to the next was aided by gravity. The transition metal catalyst component was mixed with hexane in a hexane/catalyst suspension volume ratio of 5:1. In addition, hexane was also added to the chamber containing the electron donor solution in a hexane/electron donor solution volume ratio 4:1 in order to further ensure good mixing of the catalyst components. This protocol with gravity mixing (without agitation of the pre-mixing assembly), was employed in all of the test procedures in order to provide for consistency from one test to another.

Three order of addition protocols were used in carrying out the initial experimental work. The first, Protocol A, involved initial mixing of the catalyst and co-catalyst components with the co-catalyst discharged from the uppermost first chamber into the second chamber containing the transition metal catalyst component. The third chamber was, of course, empty as described previously, with the fourth lowermost chamber containing the electron donor.

The second protocol, designated herein as Protocol B, involved initial mixing of the co-catalyst in the first chamber, followed by the electron donor in the second chamber with the transition metal component incorporated into the fourth chamber. The final order of addition, Protocol C, involved displacement of the electron donor from the uppermost first chamber into the second chamber containing the transition metal catalyst and then into the third empty chamber, followed subsequently by displacement of the mixture into the fourth chamber containing the co-catalyst.

Immediately after contact of the first resulting submixture with the third component for the desired pre-contact time, the three component system was contacted with propylene to effect a five second room temperature pre-polymeriztion of the catalyst. The resulting pre-polymerized catalyst was then discharged into the Zipperclave reactor serving as the polymerization reactor. The pre-polymerization step was carried out by charging the four chamber pre-contact assembly with liquid propylene and after the five second pre-polymerization time, discharging the contents of the pre-contact assembly by pumping 600 Ml of propylene through the assembly and into the polymerization reactor. The total propylene used in the polymerization step was about 1.45 L. Some of the propylene was retained in the pre-contact assembly which sealed off from the reactor immediately after discharging of the catalyst into the polymerization reactor. This retained propylene took no part in the polymerization reaction.

The results of the pre-mixing with the Al/Ti and Al/Si ratios at 200 and 40, respectively, under Protocols A, B and C for various initial and secondary contact times are shown in Tables I, II and III, respectively. For each of the tests, polymerization was carried out for one hour at 70° C. In Tables I–III, the initial and secondary contact times $T_1$ and $T_2$ are shown in seconds in the first and second columns. The amount of polymer produced in grams is shown in the third column, and the bulk density in grams per cubic centimeter is shown in the fourth column. The melt flow index in grams per 10 minutes for the polymer product is shown in the fifth column and the weight percent of the polymer soluble in xylene is shown in the last column.

TABLE I (Protocol A)

| $T_1$ | $T_2$ (sec) | Yield (gms) | b.d. | MFI | % XS |
|---|---|---|---|---|---|
| 5 | 30 | 174 | 0.47 | 2.06 | 3.32 |
| 10 | 30 | 184 | 0.46 | 2.08 | 3.20 |
| 40 | 30 | 238 | 0.47 | 2.10 | 3.51 |
| 120 | 30 | 242 | 0.46 | 1.91 | 3.11 |
| 40 | 0 | 276 | 0.48 | 2.00 | 3.19 |
| 70 | 0 | 256 | 0.49 | 2.19 | 3.16 |
| 20 | 50 | 278 | 0.42 | 2.59 | 3.12 |
| 20 | 80 | 270 | 0.46 | 2.14 | 2.32 |
| 40 | 60 | 216 | 0.45 | 2.28 | 3.44 |
| 40 | 110 | 214 | 0.42 | 2.16 | 3.24 |

TABLE II (Protocol B)

| $T_1$ | $T_2$ (sec) | Yield (gms) | b.d. | MFI | % XS |
|---|---|---|---|---|---|
| 5 | 30 | 217 | 0.46 | 2.48 | 3.55 |
| 40 | 30 | 240 | 0.44 | 2.68 | 3.87 |
| 70 | 30 | 250 | 0.42 | 2.51 | 4.07 |
| 120 | 30 | 261 | 0.39 | 4.72 | 5.88 |
| 40 | 0 | 242 | 0.46 | 2.57 | 3.83 |
| 70 | 0 | 296 | 0.40 | 2.73 | 3.16 |
| 20 | 50 | 221 | 0.43 | 2.38 | 3.35 |
| 20 | 80 | 258 | 0.41 | 3.28 | 4.31 |
| 40 | 60 | 224 | 0.44 | 2.49 | 3.04 |
| 40 | 110 | 237 | 0.34 | 4.44 | 6.39 |

TABLE III (Protocol C)

| $T_1$ | $T_2$ (sec) | Yield (gms) | b.d. | MFI | % XS |
|---|---|---|---|---|---|
| 5 | 30 | 182 | 0.44 | 3.58 | 4.32 |
| 20 | 30 | 172 | 0.42 | 3.14 | 4.72 |
| 40 | 30 | 151 | 0.42 | 3.22 | 4.47 |
| 120 | 30 | 118 | 0.43 | 2.53 | 3.99 |
| 40 | 0 | 196 | 0.45 | 1.93 | 2.24 |
| 70 | 0 | 176 | 0.45 | 1.93 | 2.40 |

Table IV illustrates additional results carried out for Protocol C, but using polypropylene from a different source than the polypropylene used in the experimental work reported in Tables I, II, and III. This propylene source was also used in a second suite of experimental work described later in which component ratios were changed, together with orders of addition and contact times. Experimental results vary from one propylene source to another. Accordingly, it is considered prudent to not rely upon a direct cross correlation in comparing the experimental results attained with the second propylene source with those obtained with the first propylene source. However, the work reported in Table IV can be considered with the work reported to Table III to show the results of varying the secondary contact time for Protocol C.

TABLE IV (Protocol C)

| $T_1$ | $T_2$ | Yield (gms) | b.d. | % XS | MFI |
|---|---|---|---|---|---|
| 20 | 30 | 244 | 0.43 | 3.28 | 2.70 |
| 40 | 30 | 152 | 0.40 | 3.96 | 3.12 |
| 20 | 50 | 167 | 0.40 | 7.11 | 5.26 |
| 20 | 80 | 129 | 0.37 | 6.18 | 4.74 |
| 40 | 60 | 108 | 0.32 | 8.79 | 6.45 |
| 40 | 110 | 135 | 0.38 | 7.95 | 5.46 |

Turning now to the drawings, FIGS. 1 through 6 present graphical representations of the results of the first suite of experimental work in terms of the durations of the first precontact time with the second precontact time held constant at 30 seconds and as a function of the second precontact time with the first precontact time held constant at 40 seconds. In each of FIGS. 1 through 6, the graphs are labelled by the legends. A, B, and C to correspond to the order of addition Protocols A, B, and C, as described above. Thus, in FIG. 1, for example, curve A is a plot of polymer yield, Y, on the ordinate as a function of the duration of the first precontact time, T, in seconds on the abscissa for the order of addition of the transition metal catalyst mixed initially with the co-catalyst, followed by contact of this mixture with the electron donor. Curve B is a graphical presentation of this same data for the order of addition in which the electron donor and co-catalyst are mixed first followed by addition of the transition metal catalyst and curve C shows the yield for the order of addition in which the transition metal catalyst component and the electron donor are initially mixed together, with this sub-mixture then contacted with the co-catalyst.

Figure 1:
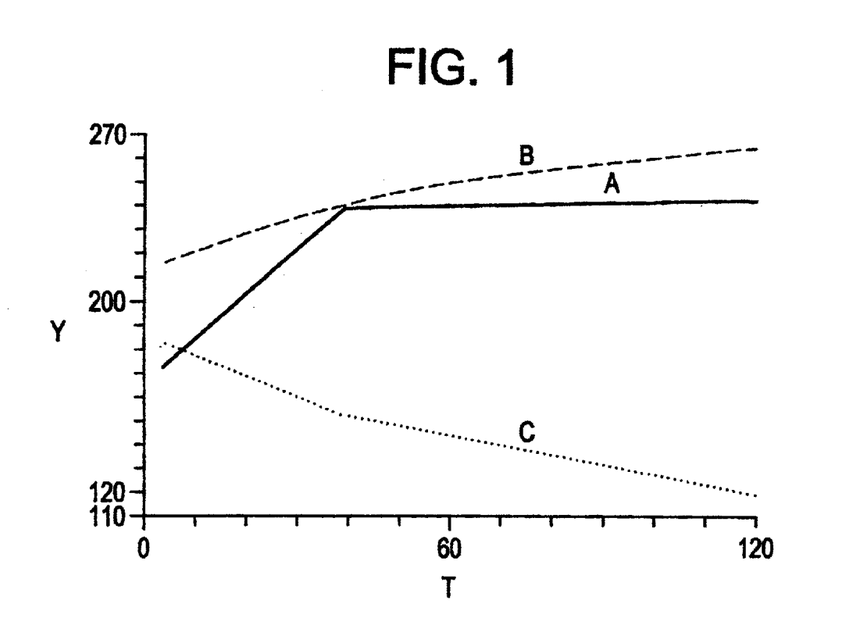
FIGS. 1 and 2 are graphical presentations of yield for various orders of addition as a function of the first and second precontact times, respectively.
Figure 2:
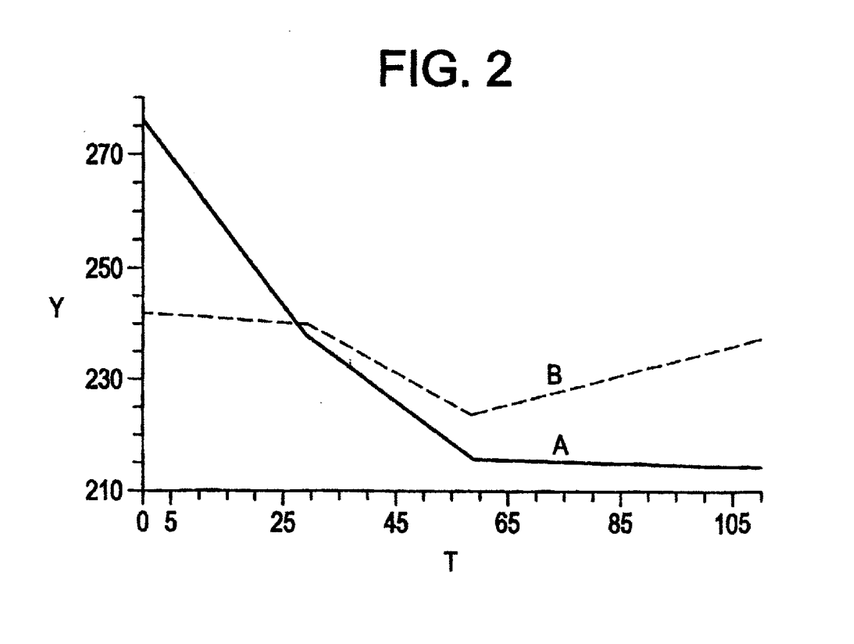
Figure 3:
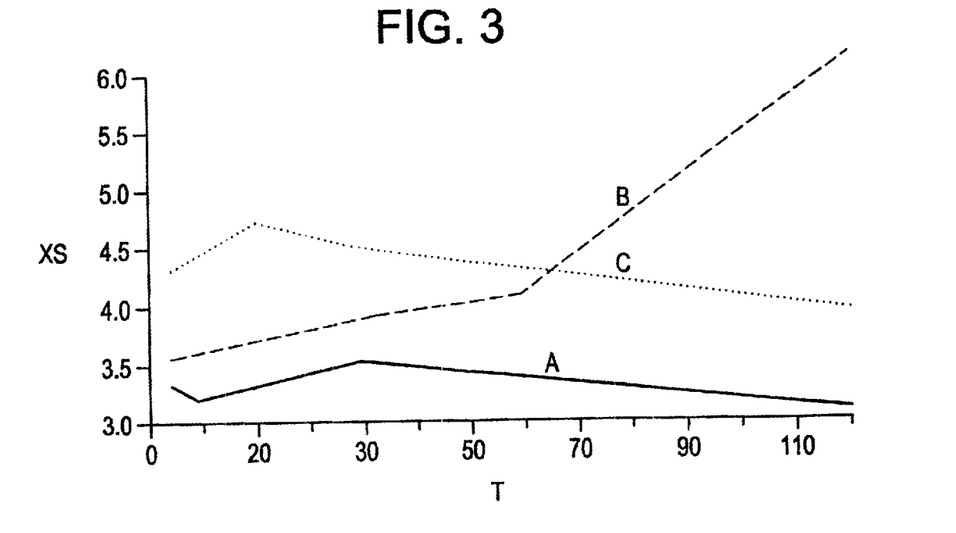
FIGS. 3 and 4 are graphs illustrating the xylene soluble content of the polymer products for various orders of addition as a function of the first and second precontact times, respectively.
Figure 4:
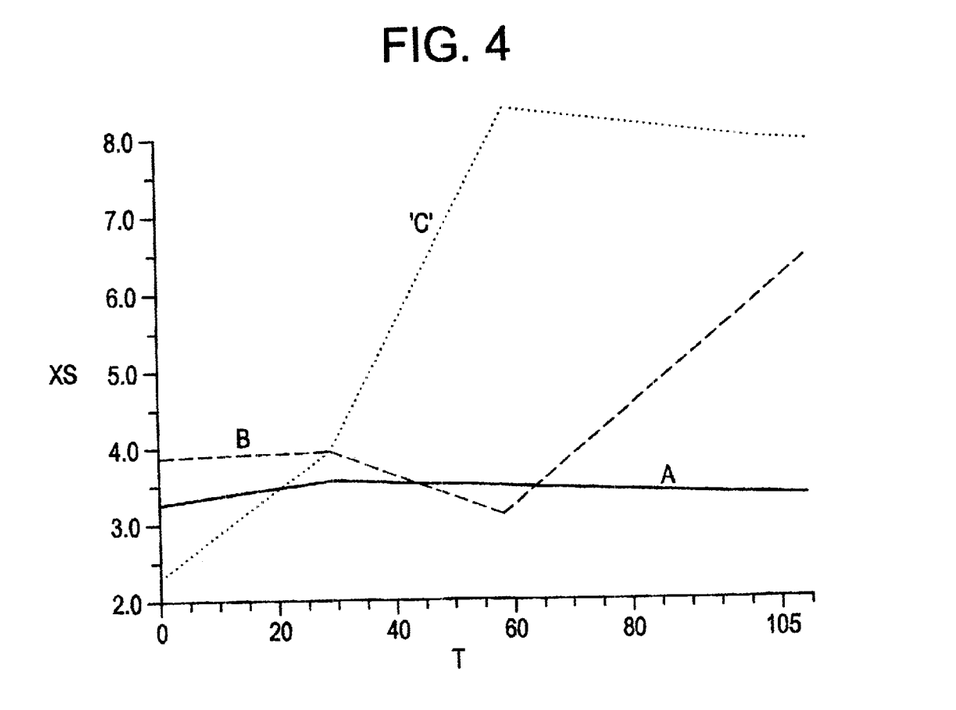
Figure 5:
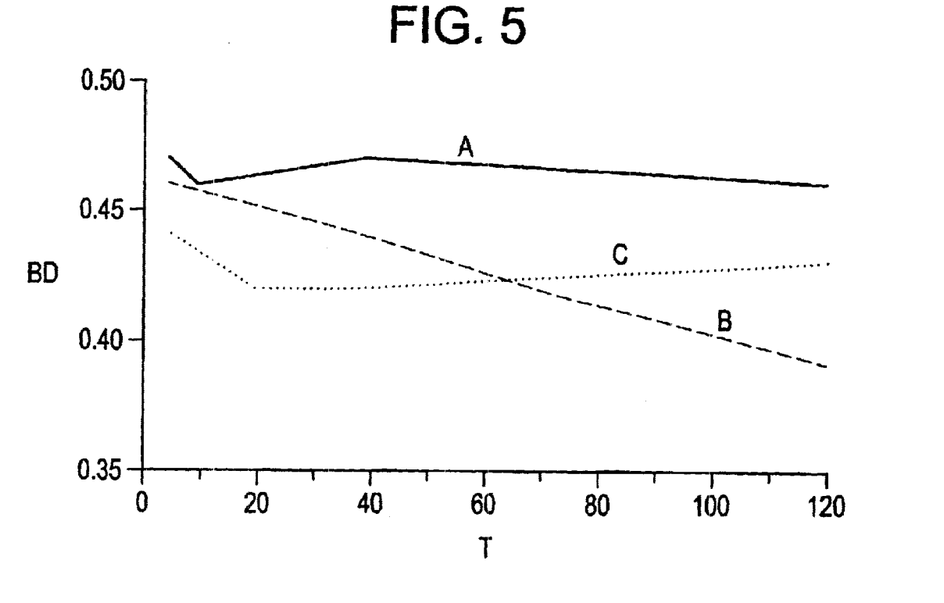
FIGS. 5 and 6 are graphical representations of the bulk density of the polymer product for the various orders of addition as a function of the first and second precontact times, respectively.
Figure 6:
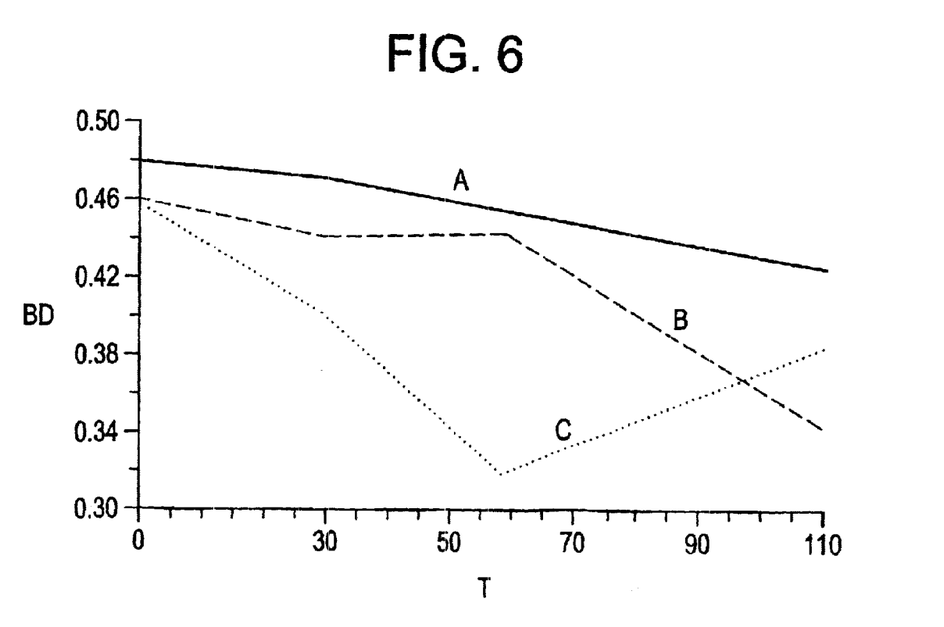

In FIGS. 1 and 2 the yield in grams, Y, is plotted on the ordinate versus the time, T, in seconds on the abscissa. In FIGS. 3 and 4, the xylene soluble content, XS, in weight percent is plotted on the ordinate versus the time, T, in seconds on the abscissa, and in FIGS. 5 and 6 the bulk density, B.D., in $g/cm^3$ is plotted on the ordinate versus the time in seconds on the abscissa. In FIGS. 1, 3 and 5, the time on the abscissa is the first precontact time with the second precontact time held constant at 30 seconds. In FIGS. 2, 4, and 6, the time is the duration of the second contact time with the first precontact time held constant at 40 seconds.

As illustrated in FIG. 1, the polymer yields for Protocols A and B generally increased as the first precontact time increased. The reverse was true for Protocol C. For very short first precontact times Protocol B offered a substantially better yield than Protocol A. However, as the precontact time lengthened to about 30 seconds and beyond, the yields were roughly comparable.

As shown in FIG. 2, Protocol A suffered a dramatic loss in activity with an increase in the second precontact time. In general, for second contact times of about 30 seconds or less, the yield is very high for Protocol A and generally as good as or better than the yield for Protocol B, which remains fairly level across the range of second contact times. The yield for Protocol C is not illustrated in FIG. 2, but would be well below that for Protocols A and B based upon the experimental work reported in Tables III and IV using the different propylene sources as described above.

As shown in FIGS. 3 and 4, Protocol A in which the transition metal catalyst and co-catalyst are mixed initially, show consistently low xylene solubles across the ranges measured for both the first and second precontact times. In every case the xylene solubles content was about 3.5% or less. For Protocol B, in which the electron donor and co-catalyst were initially mixed, the xylene solubles stayed generally low so long as the contact times during the first and second mixing steps were not allowed to become too great. An exception, however, was noted for a second precontact time of 60 seconds, where, as shown in FIG. 4, the xylene solubles content reached a minimum of about 3%. As is shown by a consideration of FIGS. 3 and 4 together, for the Protocol in which the electron donor and co-catalyst are mixed together initially, too long of durations for both the first and second contact times result in increasing xylene solubles content. In general, the third order of addition in which the transition metal catalyst component and electron donor are contacted first, results in relatively high xylene contents which are moderately high for relatively short initial contact times and extremely high for the longer second contact times as shown in FIG. 4.

As shown in FIGS. 5 and 6, the bulk density remained high for Protocol A, regardless of the duration of the first contact time. The highest bulk densities were obtained for Protocol A across the range of second contact times, although the bulk density did decrease moderately as the second contact time increased in length. Over the entire span of contact times, Protocol B produced slightly lower to substantially lower bulk densities than those achieved by Protocol A, although they were generally better than the bulk densities resulting from Protocol C. For both Protocols A and B, the bulk density progressively decreases with an increase in the second precontact time.

The melt flow data reported in Tables I–IV did not appear to indicate any clear correlation of the melt flow index with the various orders of addition between the three catalyst components and this parameter is not illustrated graphically. In general, an increase in xylene solubles was found to generally correspond to an increase in melt flow index.

From the foregoing experimental work carried out at constant ratios of aluminum, titanium and silicon, some general observations can be made regarding the advantages and disadvantages of the various orders of addition. Protocol A in which the catalyst and co-catalyst are initially mixed together generally provides the best overall results of yield, bulk density and xylene solubles content when these factors are all considered together. When using this order of addition, the yield increases initially as the first precontact time is increased and then stays relatively level, whereas it is at its highest level for a short second contact time. The bulk density is consistently high and the xylene solubles content consistently low regardless of whether the first contact time was short or long. Both bulk density and yield decreased with an increase in the second contact times with changes in the second contact time having little effect on the xylene soluble content.

Protocol B, in which the organoaluminum co-catalyst and electron donor are initially mixed, is generally the second most favorable Protocol in terms of overall results and involves a yield which varies little with the second contact time and progressively increases, but is consistently good over the range of initial contact times considered. Here, in terms of bulk density and xylene solubles, both the first and the second contact times should be kept relatively short. Protocol C generally yields overall results in terms of yield, bulk density and xylene solubles which fall short of the results achieved by Protocols A and B. However, with relatively short first and second contact times, very low levels of xylene solubles can be achieved with this order of addition.

In accordance with the present invention, the results in terms of yield, bulk density and xylene solubles can be further tailored for the various initial and secondary contact times for the different orders of addition by changing the relative amounts of catalyst, co-catalyst and organosilicon electron donor as reflected by different ratios of aluminum, transition metal, and silicon.

The experimental work here was carried out employing the various orders of addition identified previously as Protocols A, B, and C with the supported titanium tetrachloride transition metal catalyst, organoaluminum co-catalyst, and organosilicon electron donor, identified previously. Here, experimental runs were carried out at initial contact times varying from 20 to 40 seconds, followed by secondary contact times varying from 30 to 110 seconds with the ratios of aluminum, silicon and titanium also being varied. The experimental work conducted here was carried out using the various components in the same solutions and under the same experimental conditions as described previously. The experimental apparatus utilized here involved four series-connected stainless steel bombs as described previously and the pre-polymerization time was, as in the first suite of experimental work, five seconds.

The additional experimental work involving not only changes between Protocols A, B and C with different initial and secondary contact times, but also different ratios of aluminum silicon and titanium, were carried out using the propylene source used in the experimental work reported in Table IV above. The polymerization runs were conducted at 70° C. for one hour. The results of this experimental work are shown in Tables V, VI and VII for Protocols A, B and C, respectively. Tables V through VII present the results of the experimental work in a format similar to that used for Tables I through IV, except that in addition, the different ratios involved in terms of Al/Ti, Al/Si, and Si/Ti are also shown, these ratios being varied as shown in the Tables. Thus, the aluminum/titanium ratio varied from 100 to 400, the aluminum/silicon ratio from 10 to 100 and the silicon/titanium ratio varying from 2 to 20. It will be recognized that the ratios are interdependent; thus, when the aluminum/silicon ratio is maintained constant, a change in the aluminum/titanium ratio will likewise result in a change in the silicon/titanium ratio.

TABLE V (PROTOCOL A)

| T1 | T2 | Al/Ti | Al/Si | Si/Ti | Yield (gms) | b.d. | % XS | MFI |
|---|---|---|---|---|---|---|---|---|
| 20 | 50 | 100 | 40 | 2.5 | 135 | 0.40 | 9.75 | 7.16 |
| 20 | 50 | 200 | 10 | 20 | 182 | 0.46 | 2.08 | 1.79 |
| 20 | 50 | 200 | 40 | 5 | 256 | 0.45 | 5.12 | 3.54 |
| 20 | 50 | 200 | 100 | 2 | 206 | 0.37 | 12.44 | 11.42 |
| 20 | 50 | 400 | 40 | 10 | 291 | 0.42 | 4.72 | 3.56 |
| 20 | 80 | 200 | 40 | 5 | 199 | 0.43 | 5.35 | 3.54 |
| 20 | 80 | 400 | 40 | 10 | 295 | 0.44 | 2.67 | 2.64 |
| 40 | 60 | 200 | 40 | 5 | 233 | 0.45 | 5.49 | 3.72 |
| 40 | 60 | 400 | 40 | 10 | 145 | 0.45 | 3.55 | 3.02 |
| 40 | 110 | 200 | 40 | 5 | 253 | 0.46 | 3.80 | 2.81 |
| 40 | 110 | 400 | 40 | 10 | 161 | 0.40 | 3.63 | 3.10 |

TABLE VI (PROTOCOL B)

| T1 | T2 | Al/Ti | Al/Si | /Ti | Yield (gms) | b.d. | % XS | MFI |
|---|---|---|---|---|---|---|---|---|
| 20 | 50 | 100 | 40 | 2.5 | 206 | 0.36 | 7.91 | 5.58 |
| 20 | 50 | 200 | 10 | 20 | 220 | 0.46 | 2.20 | 1.70 |
| 20 | 50 | 200 | 40 | 5 | 250 | 0.38 | 7.48 | 4.06 |
| 20 | 50 | 200 | 100 | 2 | 313 | 0.30 | 12.87 | 11.91 |
| 20 | 50 | 400 | 40 | 10 | 217 | 0.40 | 3.95 | 3.01 |
| 20 | 80 | 200 | 40 | 5 | 245 | 0.35 | 7.35 | 4.17 |
| 20 | 80 | 400 | 40 | 10 | 217 | 0.43 | 4.00 | 2.98 |
| 40 | 60 | 200 | 40 | 5 | 275 | 0.39 | 5.12 | 3.33 |
| 40 | 60 | 400 | 40 | 10 | 185 | 0.42 | 3.67 | 2.45 |
| 40 | 110 | 200 | 40 | 5 | 291 | 0.41 | 4.55 | 3.28 |
| 40 | 110 | 400 | 40 | 10 | 215 | 0.44 | 3.20 | 2.46 |

TABLE VII (PROTOCOL C)

| T1 | T2 | Al/Ti | Al/Si | /Ti | Yield (gms) | b.d. | % XS | MFI |
|---|---|---|---|---|---|---|---|---|
| 20 | 30 | 200 | 40 | 5 | 244 | 0.43 | 3.28 | 2.70 |
| 40 | 30 | 200 | 40 | 5 | 152 | 0.40 | 3.96 | 3.12 |
| 20 | 50 | 200 | 40 | 5 | 167 | 0.40 | 7.11 | 5.26 |
| 20 | 50 | 200 | 100 | 2 | 222 | 0.40 | 9.74 | 7.47 |
| 20 | 50 | 400 | 40 | 10 | 148 | 0.40 | 3.59 | 3.27 |
| 20 | 80 | 200 | 40 | 5 | 129 | 0.37 | 6.18 | 4.74 |
| 20 | 80 | 400 | 40 | 10 | 189 | 0.40 | 3.23 | 2.82 |
| 40 | 60 | 200 | 40 | 5 | 108 | 0.32 | 8.79 | 6.45 |
| 40 | 60 | 400 | 40 | 10 | 141 | 0.40 | 3.16 | 2.56 |
| 40 | 110 | 200 | 40 | 5 | 135 | 0.38 | 7.95 | 5.46 |
| 40 | 110 | 400 | 40 | 10 | 156 | 0.41 | 2.88 | 2.80 |

The results of this second set of experimental work are presented in FIGS. 7 through 14 of the drawings, with yield, bulk density or xylene soluble content plotted inordinate versus various component ratios plotted on the abscissa for different suites of first and second contact times. As in the drawings described previously, in each of the FIGS. 7 through 14, the curves are labelled by the legends A, B and C, to correspond to the order of addition Protocols A, B and C.

Figure 7:
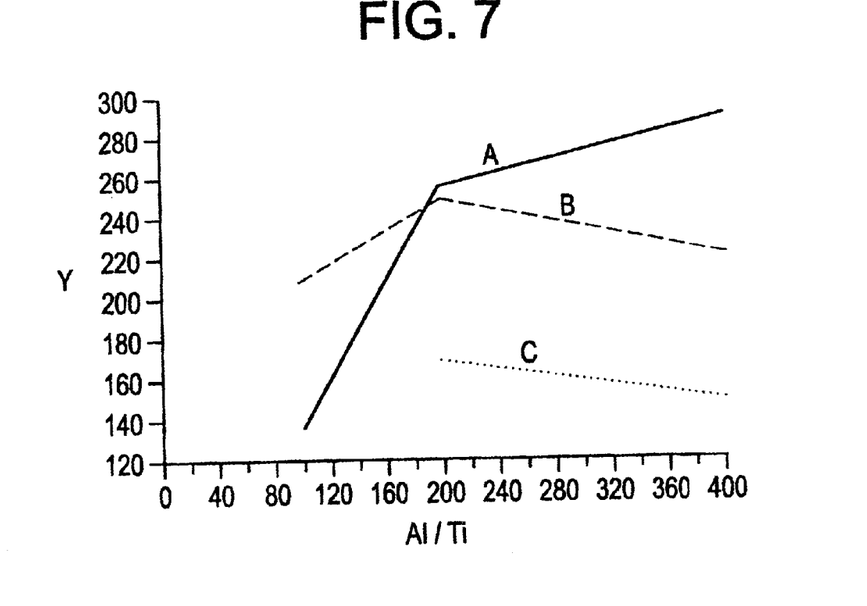
FIGS. 7 and 8 are graphs of yield as a function of aluminum/titanium mole ratio for various orders of addition.
Figure 8:
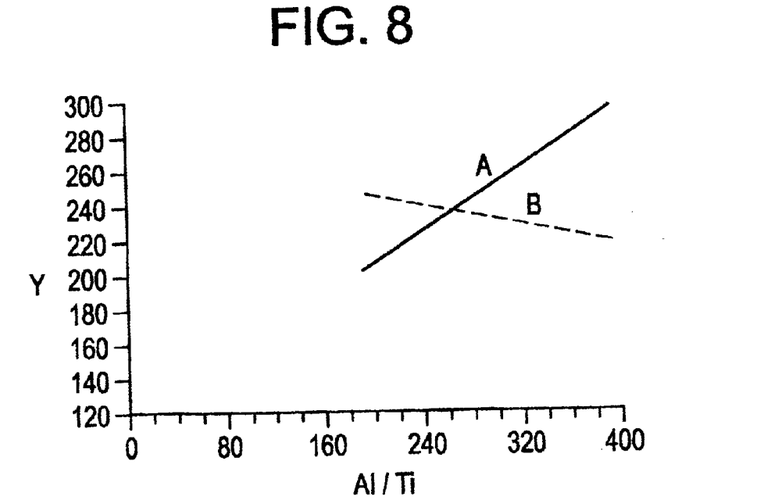
Figure 9:
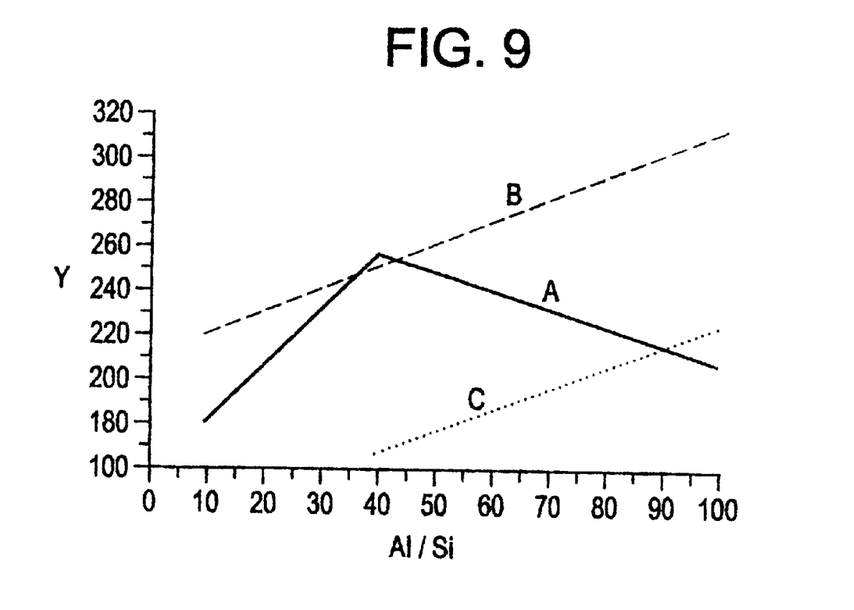
FIG. 9 is a graph of yield versus aluminum/silicon mole ratio for the orders of addition shown in FIG. 7.
Figure 10:
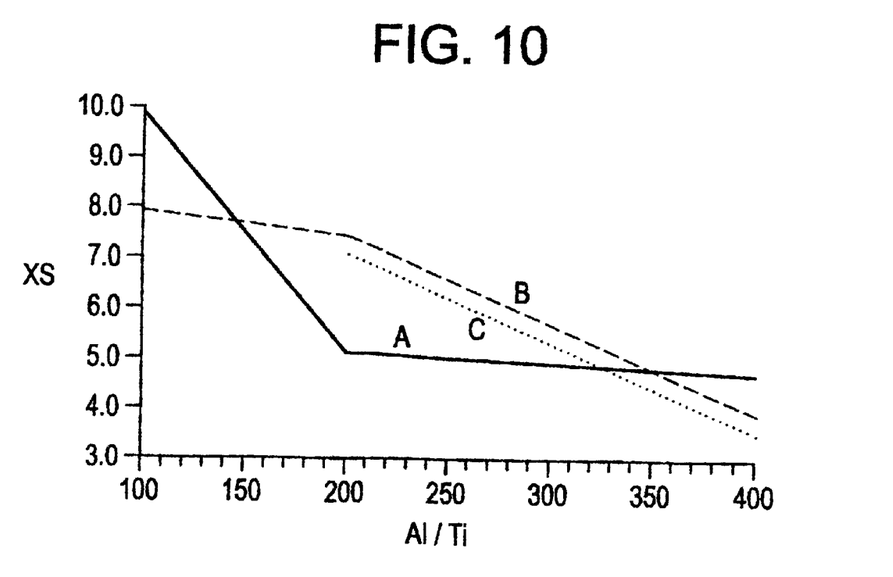
FIGS. 10, 11 and 12 are graphs illustrating the xylene soluble content of the polymer product for the various orders of addition as a function, respectively, of aluminum/titanium and aluminum/silicon and silicon/titanium ratios.
Figure 11:
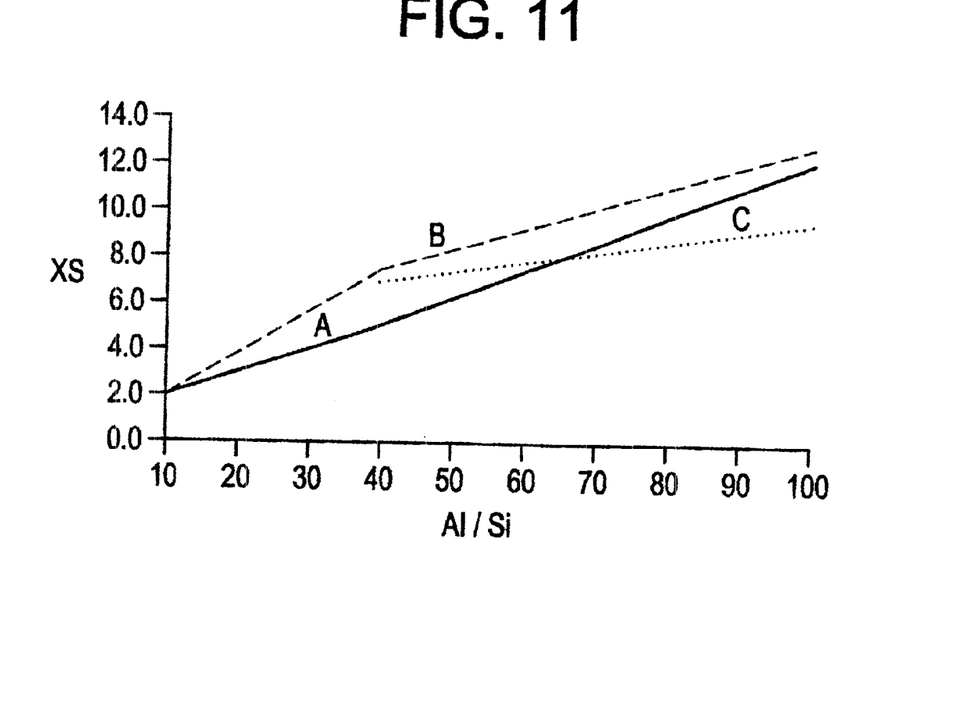
Figure 12:
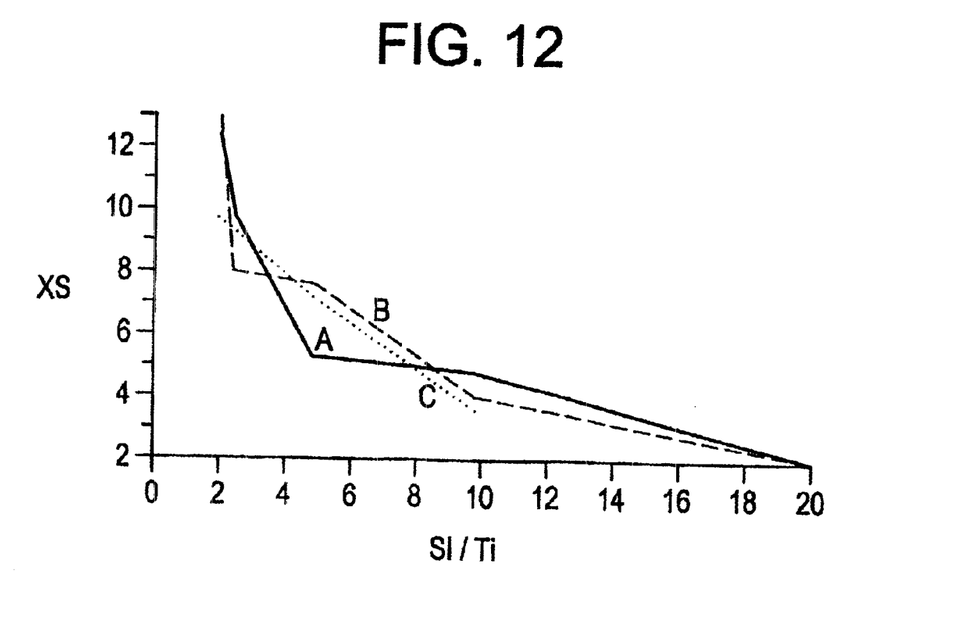
Figure 13:
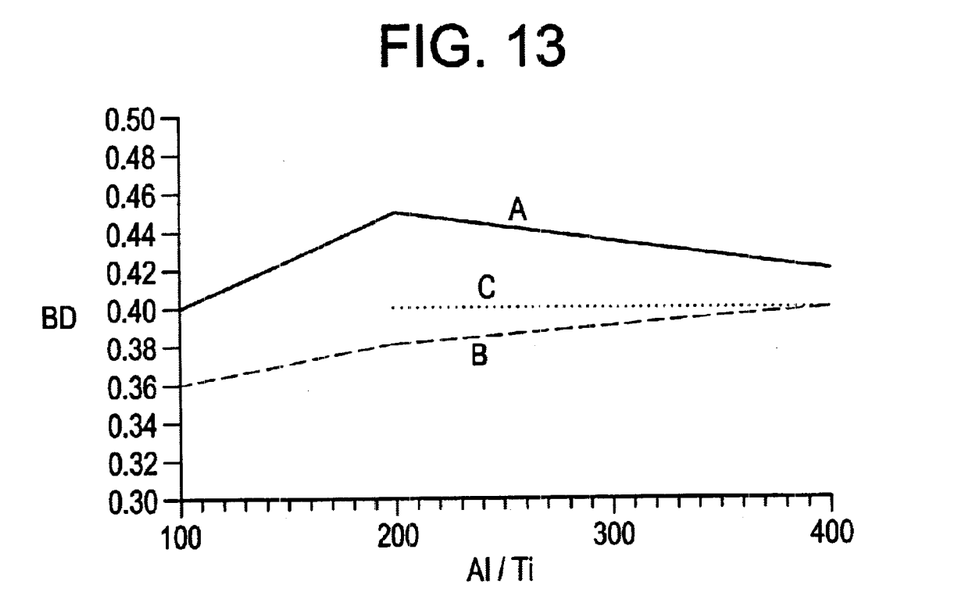
FIGS. 13 and 14 are graphical representations of the bulk density of the polymer product for the various orders of addition as a function of aluminum/titanium and aluminum/silicon ratios, respectively.
Figure 14:
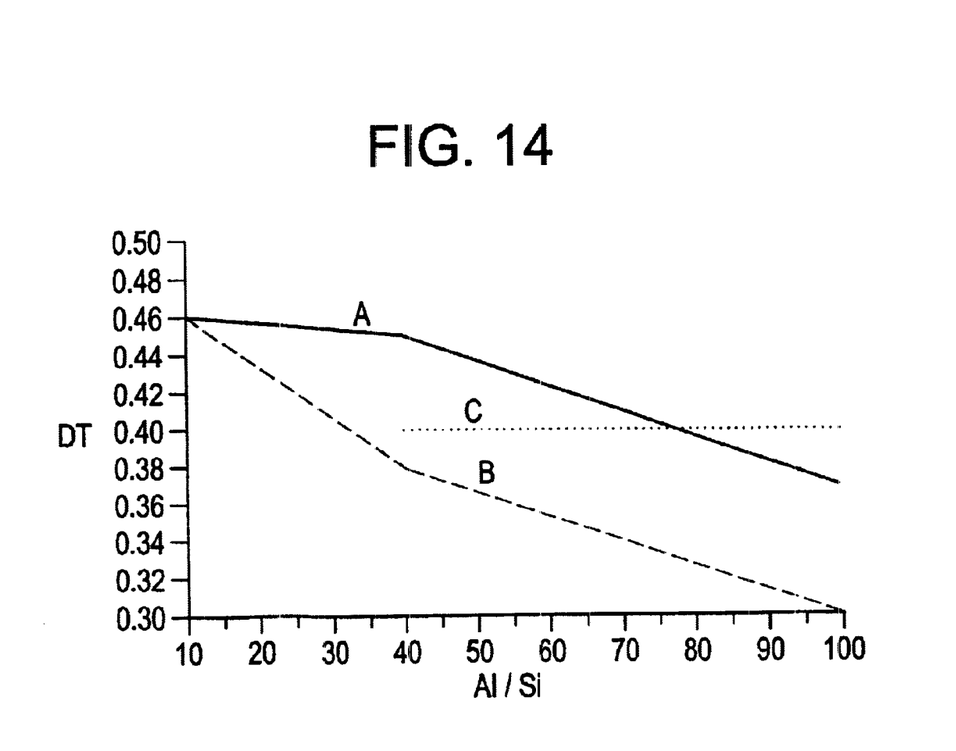

In the drawings, FIGS. 7 and 8 are graphs of yield, Y, in grams versus aluminum/titanium mole ratio, Al/Ti. FIG. 9 is a graph of yield, Y, for the three orders of addition plotted as a function of the aluminum/silicon mole (atomic) ratio, Al/Si, plotted on the abscissa. FIGS. 10 and 11 are graphs of percent xylene content, XS, plotted on the ordinate versus aluminum/titanium and aluminum/silicon mole ratios, respectively. In FIG. 12, the xylene soluble content is plotted on the ordinate as a function of silicon/titanium mole ratio, Si/Ti, on the abscissa, but at varying aluminum/titanium ratios. FIGS. 13 and 14 are graphs of bulk density (BD) in $g/cm^3$ on the ordinate versus aluminum/titanium and aluminum/silicon mole ratios, respectively.

In FIGS. 7 and 9 through 14, the first and second contact times were maintained at 20 seconds and 50 seconds, respectively. In FIG. 8, the initial and secondary contact times were 20 and 80 seconds, respectively. In FIGS. 7, 8, 10 and 13, where the results are plotted versus changing aluminum/titanium ratios, the aluminum/silicon ratio was maintained constant at 40. In FIGS. 9, 11 and 14, where the aluminum/silicon ratio was varied, the aluminum/titanium ratio was maintained at 200.

From the foregoing experimental work presented in Tables V through VII and FIGS. 7 through 14, it will be recognized that for Protocol A involving initial contact of the organoaluminum compound and the transition metal catalyst component, good results in yield can be achieved over a wide range of initial and secondary contact times when the aluminum/titanium and aluminum/silicon ratios are at about 200 and 40, respectively. However, still good results can be achieved when the aluminum/titanium ratio is varied up to 400, which, at an aluminum/silicon ratio of 40, corresponds to a silicon/titanium mole ratio of 10. Similarly, good results can be achieved in terms of bulk density and xylene solubles under the aforementioned conditions. Desirably, the silicon/transition metal ratio should be no more than 10. It can be lower. Relatively good results in terms of yield can be achieved at a silicon/transition metal ratio of about 2, corresponding to an aluminum/silicon ratio of 100 and an aluminum/transition metal ratio of 200.

When xylene solubles are considered alone, there is generally less latitude in terms of primary and secondary contact times than is the case when considering yield and bulk density. In general, the best (lowest) xylene soluble content of the polymer product results when aluminum/silicon ratios are about 40, with the aluminum/transition metal ratio varying from 200 to 400 for initial and secondary contact times of about 2 to 40 and 60 to 120 seconds, respectively. However, the very lowest xylene soluble content was achieved at short initial and secondary contact times of 20 and 50 seconds, respectively at aluminum/titanium ratios of 200 and aluminum/silicon ratios of 10. Good results here were also achieved in terms of bulk density, although not for yield.

For the second Protocol involving initial mixing of the organoaluminum compound and the organosilicon compound, the best results in terms of yield were achieved under the same conditions of aluminum/transition metal and aluminum/silicon ratios as described previously. In addition, good results in terms of yield, bulk density and xylene contents were achieved at aluminum/transition metal and aluminum/silicon ratios of 20 and 10, respectively similarly as described above for Protocol A, but in addition, good results in terms of yield were achieved at this value also.

For the third order of addition, very short initial and secondary contact times as noted previously, could be employed in order to arrive at good results in terms of yield and relatively good results in terms of bulk density and xylene content at aluminum/transition metal and aluminum/silicon ratios of 20 and 40, respectively. When only yield is considered, satisfactory results can be achieved at substantially higher aluminum/silicon ratios of 100 and aluminum/titanium ratio of 200, again, at relatively short initial and secondary contact times of 20 and 50 seconds, respectively. Longer contact times of 40 and 110 seconds could be employed where the aluminum/transition metal and aluminum/silicon ratios were 400 and 40, respectively, although here the yields and bulk densities were not as good.

Having described specific embodiments of the present invention, it will be understood that modifications thereof may be suggested to those skilled in the art, and it is intended to cover all such modifications as fall within the scope of the appended claims.

What is claimed is:

1. A process for the polymerization of propylene with a Ziegler-type catalyst formulation comprising a transition metal catalyst component, an organosilicon electron donor component and an organoaluminum co-catalyst component, the steps comprising:
    (a) combining said organoaluminum co-catalyst component selected from the group consisting of trimethylaluminum and triethylaluminum with said transition metal catalyst component comprising titanium tetrachloride in relative amounts to formulate a precursor mixture having a molar ratio of aluminum to titanium from 200 to 400, wherein the precursor formulation of the organoaluminum co-catalyst and transition metal catalyst component is maintained for a time within the range of 5–120 seconds prior to subsequent contact with the organosilicon electron donor component;
    (b) combining said precursor mixture with said electron donor component comprising an organosilane to produce a Ziegler-type catalyst formulation of said transition metal catalyst component, electron donor component in relative amounts to provide an aluminum/silicon mole ratio of no more than 50; and
    (c) thereafter contacting said Ziegler-type catalyst mixture with propylene to effect polymerization of said propylene in the presence of said Ziegler-type catalyst mixture to produce a polymerization product.

2. The process of claim 1, wherein the mole ratio of aluminum to silicon in said mixture is within the range of 20–50.

3. The process of claim 1, wherein the ratio of silicon to titanium is within the range of 5–20.

4. The process of claim 1, wherein step (c) is carried out as a prepolymerization reaction to effect pre-polymerization of said Ziegler catalyst formulation and thereafter introducing said pre-polymerized catalyst into a polymerization reactor containing propylene.

5. The process claim 1, wherein said transition metal component is a titanium tetrahalide supported on a magnesium or zinc based support.

6. The process of claim 1, wherein said electron donor is an organodialkoxysilane.

7. The process of claim 6, wherein said electron donor is cyclohexalmethyldimethoxysilane.

8. A process for the polymerization of a $C_2$–$C_4$ alpha olefin with a Ziegler-type catalyst formulation comprising a transition metal catalyst component, an organosilicon electron donor component and an organoaluminum co-catalyst component, the steps comprising:
    (a) combining said organoaluminum co-catalyst component comprising an aluminum trialkyl or an aluminum alkyl halide with said transition metal catalyst component comprising a halide of titanium, zirconium or hafnium in relative amounts to formulate a precursor mixture having an aluminum to transition metal mole ratio from 200 to 400, wherein the precursor formulation of the organoaluminum co-catalyst and transition metal catalyst component is maintained for a time within the range of 5–120 seconds prior to subsequent contact with the organosilicon electron donor component;
    (b) combining said precursor mixture with said electron donor component comprising an organosilane to produce a Ziegler-type catalyst formulation of said transition metal catalyst component, electron donor component in relative amounts to provide an aluminum/silicon mole ratio of no more than 50; and
    (c) thereafter contacting said Ziegler-type catalyst mixture with a $C_2$–$C_4$ alpha olefin to effect polymerization of said olefin in the presence of said Ziegler-type catalyst mixture to produce a polymerization product.

9. The process of claim 8, wherein said $C_2$–$C_4$ alpha olefin comprises propylene.

10. The process of claim 9, wherein said transition metal component is a titanium tetrahalide supported on a magnesium or zinc based support.

11. The process of claim 9, wherein said co-catalyst is selected from the group consisting of trimethylaluminum and triethylaluminum.

12. The process of claim 9, wherein said electron donor is an organodiakoxysilane.

13. The process of claim 12, wherein said electron donor is cyclohexalmethyldimethoxysilane.

14. The process of claim 12, wherein said co-catalyst is trimethyaluminum or triethylaluminum.

15. The process of claim 8, wherein step (c) is carried out as a prepolymerization reaction to effect pre-polymerization of said Ziegler catalyst formulation and thereafter introducing said pre-polymerized catalyst into a polymerization reactor containing an olefin.

16. A process for the polymerization of propylene with a Ziegler-type catalyst formulation comprising a transition metal catalyst component, an organosilicon electron donor component and an organoaluminum co-catalyst component, the steps comprising:
    (a) combining said organoaluminum co-catalyst component comprising an aluminum trialkyl or an aluminum alkyl halide with said transition metal catalyst component comprising a halide of titanium, zirconium or hafnium in relative amounts to formulate a precursor mixture having an aluminum to transition metal mole ratio from 200 to 400, wherein the precursor formulation of the organoaluminum co-catalyst and transition metal catalyst component is maintained for a time within the range of 5–120 seconds prior to subsequent contact with the organosilicon electron donor component;
    (b) combining said precursor mixture with said electron donor component comprising an organosilane to produce a Ziegler-type catalyst formulation of said transition metal catalyst component, electron donor component in relative amounts to provide an aluminum/silicon mole ratio of no more than 50; and (c) contacting said Ziegler-type catalyst formulation with propylene to effect prepolymerization of said Ziegler-type catalyst formulation; and (d) thereafter introducing said prepolymerized catalyst formulation into a continuous loop-type polymerization reactor containing propylene to produce a polymerization product.

17. The process of claim 16, wherein said Ziegler catalyst formulation is pre-polymerization for a time period of less than one minute prior to introduction of said pre-polymerization catalyst formulation into said polymerization reactor.

* * * * *